Nov. 1, 1949 E. S. SMITH 2,487,037
APPARATUS FOR AUTOMATICALLY CONTROLLING TEMPERATURES
Filed July 23, 1946 5 Sheets-Sheet 1
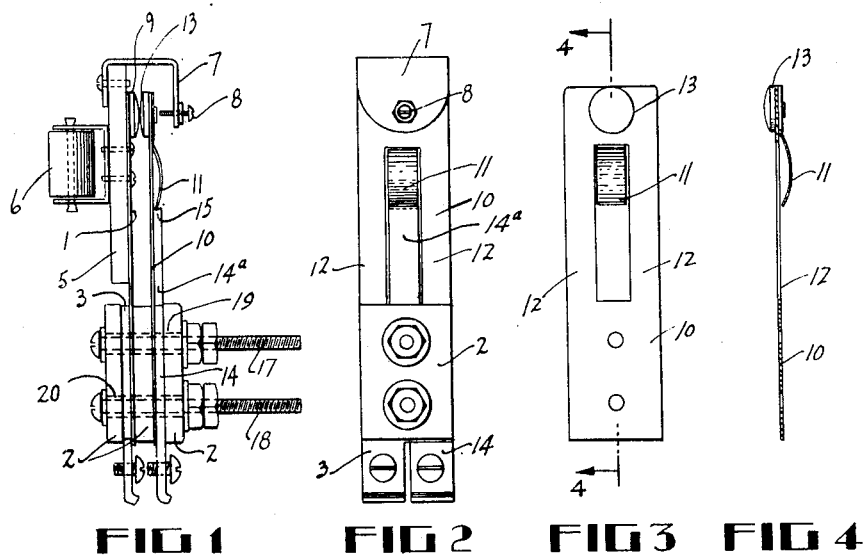
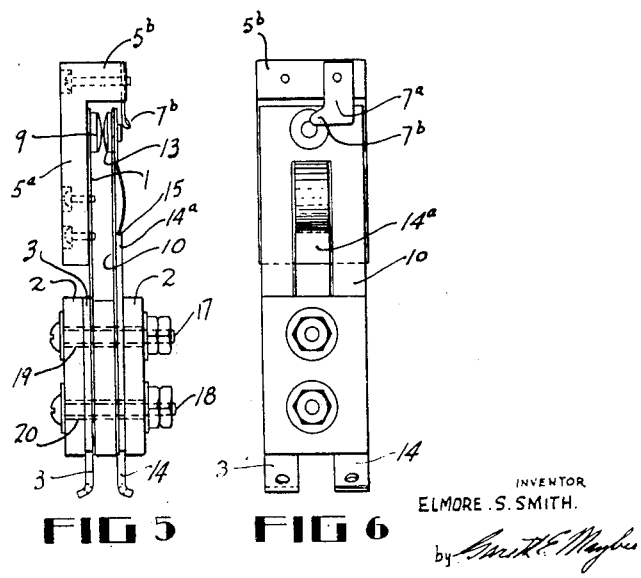
INVENTOR
ELMORE S. SMITH.
Attorney

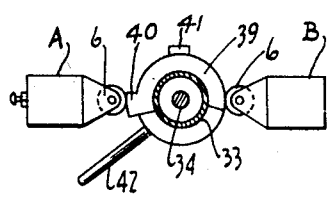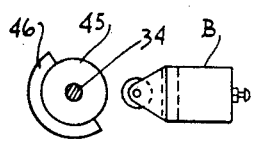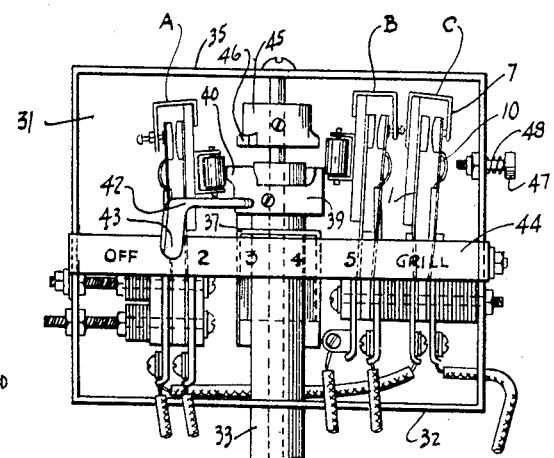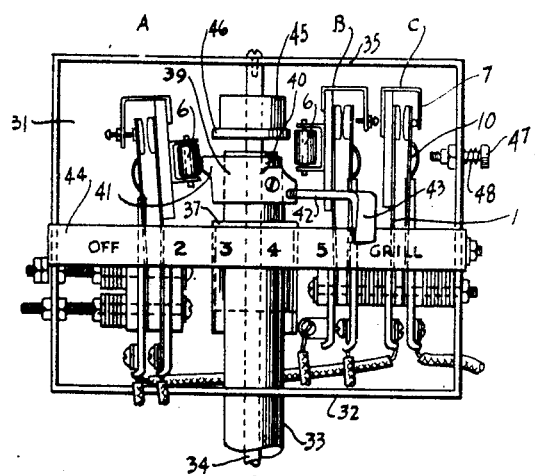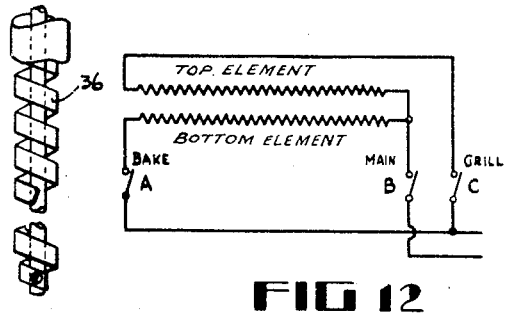

Nov. 1, 1949 E. S. SMITH 2,487,037
APPARATUS FOR AUTOMATICALLY CONTROLLING TEMPERATURES
Filed July 23, 1946 5 Sheets-Sheet 3
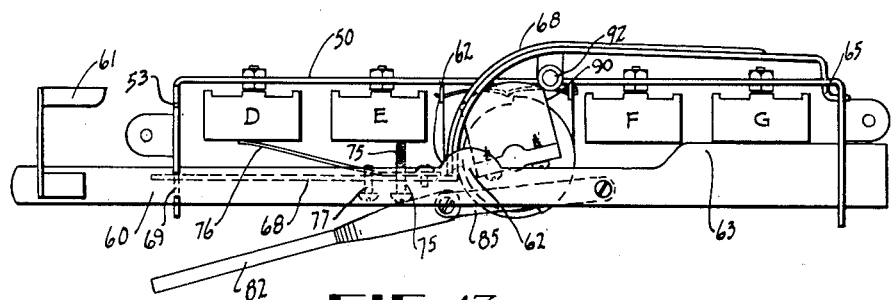
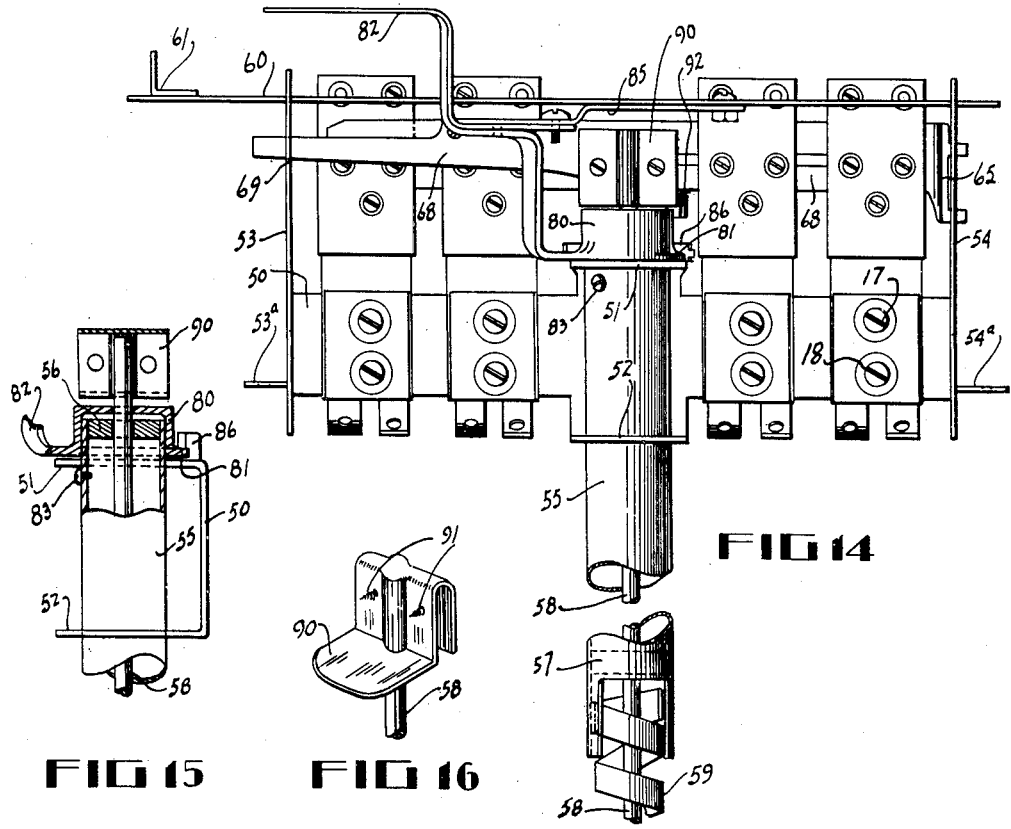
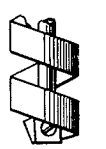
ELMORE · S· SMITH
INVENTOR
Attorney Nov. 1, 1949          E. S. SMITH          2,487,037

APPARATUS FOR AUTOMATICALLY CONTROLLING TEMPERATURES

Filed July 23, 1946          5 Sheets—Sheet 4

ELMORE · S · SMITH
INVENTOR.

by
Attorney.

Nov. 1, 1949      E. S. SMITH      2,487,037

APPARATUS FOR AUTOMATICALLY CONTROLLING TEMPERATURES

Filed July 23, 1946      5 Sheets-Sheet 5

ELMORE S. SMITH
INVENTOR by *[signature]*
Attorney.

Patented Nov. 1, 1949

2,487,037

UNITED STATES PATENT OFFICE 2,487,037

APPARATUS FOR AUTOMATICALLY CONTROLLING TEMPERATURES

Elmore Stanley Smith, Weston, Ontario, Canada, assignor to Moffats Limited, Weston, Ontario, Canada, a corporation Application July 23, 1946, Serial No. 685,627

14 Claims. (Cl. 219—20)

The present application is a continuation-in-part of my prior application Serial No. 561,114, filed October 30, 1944, now abandoned, insofar as the contents of the present application have been set forth in such earlier application. Reference is also made to co-pending application Serial No. 685,626 which discloses subject matter in common with this application.

This invention relates to apparatus for automatically controlling the temperature of an electric oven to maintain the latter at a predetermined temperature, and a main object thereof is to provide a simple, rugged, compact and inexpensive device of this character for controlling the current in such a way that the oven may be heated quickly to the desired temperature, and thereafter controlling it in such a way that the oven may be maintained at that temperature by using a "slower" heat.

A further object of this invention is to provide an oven control of the class described, that is simple in action and which is readily adjusted so that it will control the temperature of the oven very closely between the desired maximum and minimum temperatures for which it is set, and the current conductors being so disposed within the device that they will always ensure the proper current paths without the danger of short circuits.

A further object of this invention is to provide a thermostatic electric oven control of the type described which is devoid of delicate or filamentary electrical connections which are liable to burn out during surges in the current, and which are adapted to conduct the current between the relatively movable parts which are adjustable by the user to operate at a predetermined temperature, or which are adjustable by the thermostat in response to temperature changes.

To attain my objects, I provide two alternative control constructions, which for the sake of clarity will be separately described; the first type of control is referred to herein as the "simple" control, whereas the other type is referred to as the "booster" type control.

The simple type control is preferably used in an oven having two groups of elements which for convenience will be called the "top" and "bottom" elements, but it may also be used in an oven having a single element tapped in a plurality of positions. In the simple control I provide three snap-action switches, one, the Bake switch being in series with the bottom element, another, the Grill switch being in series with the top element, and a third, the Main switch being in series with both elements. The Bake switch and the Main switch may be turned on and off by a novel type of manually adjustable lever which actuates a cam mechanism, whereas the Grill switch may be turned on only by a manual push-button. Furthermore, the Main switch may also be turned on and off and the Grill switch may be turned off by a novel type of thermostatically controlled cam.

When the manually adjustable cam is set at the "off" position, all the switches are off. If the manually adjustable lever is adjusted to the Grill position, and the Grill push-button is depressed, the Main switch is on, the Grill switch is on and the Bake switch is off; therefore only the top element will heat. If the oven becomes too hot, the thermostatically controlled cam will turn the Main and Grill switches off, and upon cooling sufficiently the Main switch will turn on again, but the Grill switch may be reset only by depressing the push-button.

To pre-heat the oven, the manually adjustable lever is set to any position other than "off" and Grill, thereby turning on the Bake and the Common switches, and then the Grill push-button is depressed; thus, both the top and bottom elements are on. When the oven reaches the desired temperature, the thermostatically controlled cam will open the Main and the Grill switch, thereby turning off both elements. When the oven has cooled sufficiently, the Main switch will close again but the Grill switch will remain open; therefore, the oven will be maintained at the desired predetermined temperature by means of the bottom element only.

The "booster" type control although basically similar to the "simple" control, differs considerably therefrom in constructional details. Moreover its performance and characteristics are somewhat superior to those of the simple type control. It is used with an oven having a main top element, a booster top element, and a bottom element. Four snap-action switches are used therein, including a Bake switch in series with the bottom element, a Grill switch in series with the top element, a Boost switch in series with the booster element, and a Main switch in series with all the elements.

With this control, all the switches are controlled by a single manually adjustable lever, and they are also actuated by a thermostatically controlled cam.

When the manually adjustable lever is adjusted to the "off" position, the circuits to all the switches are open. If the lever is set at the Grill position, the Grill, Boost and Main switches are closed, whereas the Bake switch is open, and thus the top and the booster elements only are on. If the oven becomes too hot, the main switch is opened by means of the thermostatically controlled cam, thereby allowing the oven to cool slightly and when the oven has sufficiently cooled, the thermostatically controlled cam releases the Main switch thus allowing the oven to heat once again, and so on.

If the manually adjustable lever was originally at the "off" position, and is then set to any position other than Grill, the Grill and Boost switches will remain off, whereas the Main and Bake switches will be turned on; thus only the bottom element will heat. If the oven becomes too hot, the thermostatically controlled cam will open the main switch, thus turning off the bottom element. When the oven has cooled sufficiently, the thermostatically controlled cam will release the Main switch and the bottom element will heat again, and so on.

If it is desired to pre-heat the oven, that is to heat the cold oven rapidly to a predetermined temperature, the manually adjustable lever is moved to the Grill position, and is immediately afterwards moved back to the position indicating the desired temperature. By this operation, the Grill, Bake and Main switches are closed, whereas the Boost switch is open. When the desired temperature is reached, the thermostatically controlled cam will open the Grill and Main switches, and when the oven has sufficiently cooled the Main switch will close once again, whereas the Grill switch will remain open. Thus the top element may be used to pre-heat the oven, and once it has attained the desired temperature the oven is kept at that temperature by the bottom element only.

The constructions are hereinafter more fully described and are illustrated in the accompanying drawings wherein like reference characters indicate like parts in the several views, and in which Figure 1 is a side elevation of one form of snap-action switch used with this invention;

Figure 2 is a front elevation thereof;

Figure 3 is a rear elevation of the snap-action contact carrier forming part of the said switch;

Figure 4 is a cross-sectional view taken through the line 4—4 of Figure 3;

Figure 5 is a side elevation of a modified form of snap-action switch;

Figure 6 is a front elevation of said modified snap-action switch;

Figure 7 is a front elevation of a "simple" type control with the manually adjustable lever at the "off" position;

Figure 8 is a front elevation of said control with the manually adjustable lever at the Grill position;

Figure 9 is a top plan view of the manually operable cam used in said control in the "off" position, showing the followers of the two adjacent switches coacting therewith.

Figure 10 is a top plan view of the thermostatically actuated cam used in said control showing also the follower of the Main switch which is actuated thereby;

Figure 11 is a longitudinal section of the operating tube, spindle, and cams used in said control;

Figure 12 is a circuit diagram of a two element oven controlled by a "simple" type control;

Figure 13 is a top plan view of a "booster" type control with the manually adjustable lever set at the "off" position;

Figure 14 is a front elevation of said "booster" type control with the manually adjustable lever in the "off" position;

Figure 15 is a longitudinal cross section of the operating tube, spindle and thermostatically actuated cam of said "booster" type control;

Figure 16 is a perspective view of the adjustable thermostatically actuated cam used in said control;

Figure 17:
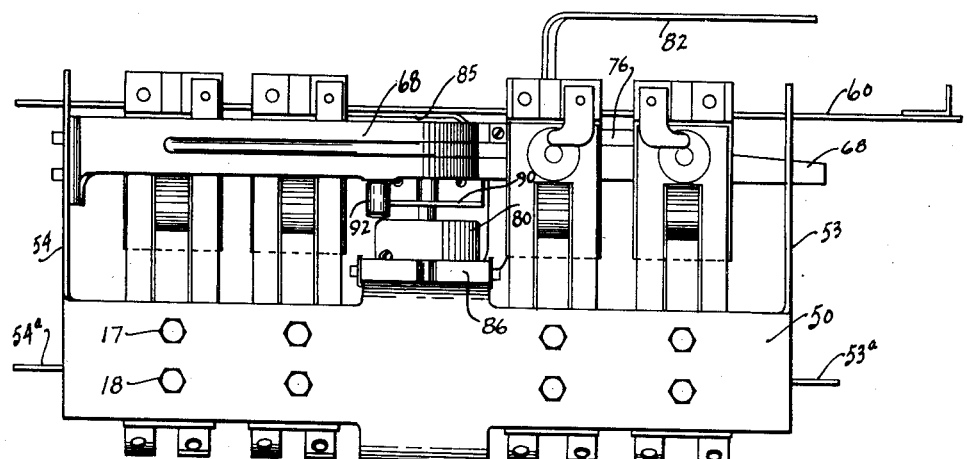
Figure 17 is a rear elevation of the "booster" type control, with the manually adjustable settable lever at the "off" position.

Before proceeding with the description of the controls the various types of snap-action switches used therewith will first be described and reference is made particularly to Figures 1, 2, 3, 4, 5, and 6.

A resilient stop carrier 1 is secured in cantilever fashion to the insulating base 2, said base 2 being constructed of three parallel sections of rigid insulating material. In electrical contact with the resilient stop carrier 1 is a flat, rigid electrical conducting bar 3, to the lower end of which may be connected a terminal wire of an electrical circuit.

Referring to Figures 1 and 2, fixedly secured to the resilient stop carrier and spaced from the insulating base 2 is a rigid bar of insulating material 5 to which may be attached a cam follower 6 for a purpose hereinafter described. Secured to the top portion of said insulating member is a stop 7 with an adjustable set screw 8. To the upper portion of the resilient stop carrier is secured an arc-resisting contact 9. The stop carrier thus is a resilient contact finger.

The contact snap-action carrier 10 is preferably made of a thin sheet of spring material which has been split into three portions, namely a short central tongue 11, which constitutes a compression arm, and a pair of tension legs 12. These three portions are rigidly joined together at the top extremity thereof, and secured thereto opposite arc-resisting contact 9 is an arc-resisting contact 13. The contact carrier thus is a snap-action contact finger.

Figures 3 and 4 are respectively a front elevation and a cross-sectional view of a contact carrier 10. It will be observed that tension legs 12 and central tongue 11 are in practice formed by a punching operation performed on the blank from which is made contact carrier 10. The legs are integral at their lower extremity, as may clearly be seen in Figure 3, and this facilitates mounting to the base. The two tension legs 12 are secured in cantilever fashion to the insulating base 2. Adjacent the tension legs 12 is a rigid, flat electrical conducting bar 14 to the lower end of which may be connected the second terminal wire of an electrical circuit.

Extending from the conducting bar 14 is a bearing member 14a at the top extermity of which is a V-notch 15. In this V-notch 15 is pivoted the central tongue 11 of snap-action contact carrier 10. The central tongue is normally flat, but is confined to a bowed shape and is in longitudinal compression against the bearing member 14a, the legs 12 of the contact carrier being thereby in longitudinal tension.

The tension legs 12 and the central tongue 11 of the contact carrier being respectively in tension and in compression, the contact carrier tends to assume a curved position to either side of its dead centre, depending to what side thereof it is pushed by an external force.

The three insulating sections of the base 2, the lower end of the tension legs 12 of the contact carrier 10, and the lower end of the stop carrier 1 are secured together by bolts 17 and 18, said bolts being encircled by insulating sleeves 19 and 20 in order to prevent them coming in electrical contact with the contact carrier 10 and the stop carrier 1. These bolts are also used to mount the switch to the body of the control.

If the switch has been pre-set in order that it may remain normally closed, then arc-resisting contacts 9 and 13 are normally in mechanical and electrical contact with each other. However, if an external force is applied to the back of resilient stop carrier 1, say by pushing against insulating bar 5 or cam follower 6, this force will be transmitted to snap-action contact carrier 10 and will cause it to eventually spring and snap beyond its dead centre, thus opening the electrical circuit. The contact carrier, upon being thrust beyond its dead centre will come to rest against set screw 8 of stop 7; if the external force which was applied to the resilient stop carrier is removed therefrom, the stop will pull back the contact carrier beyond its dead centre, and arc-resisting contact 13 thereof will return in electrical contact with arc-resisting contact 9 of the stop carrier.

If on the other hand, the switch has been pre-set so as to be normally open, arc-resisting contacts 9 and 13 are normally out of mechanical and electrical contact with each other. However, if an external force is applied to the front of resilient stop carrier 1 by pushing against stop 7, or if a force is applied to the front of contact carrier 10, the contact carrier will spring and snap beyond its dead centre, thus closing the electrical circuit. If the external force which was applied to the front of the stop carrier or to the front of the contact carrier is removed therefrom, the contact carrier will spring back beyond its dead centre, and arc-resisting contacts 9 and 13 will no longer be touching each other, and therefore the electrical circuit will be opened.

If the switch is so adjusted that the contacts thereof normally remain in the position in which they have last been set, or in other words, if the switch is so adjusted that the snap-action contact carrier 10 will normally remain on either side of its dead centre, then assuming that the switch has been closed and then a force is applied to the back of the resilient stop carrier, the switch will open and it will remain open even after said force is removed therefrom. To close the switch, a force must be applied to the front of resilient stop carrier 1 by pressing against stop 7 or to the front of contact carrier 10, and it will remain closed even after said force is removed therefrom.

The set screw 8 is provided to adjust the gap between arc-resisting contact 9 of resilient stop carrier 1 and stop 7, thereby determining the distance that the contact carrier may move to each side of its dead centre. This gap will then control the sensitivity of the switch, and the switch can therefore be adjusted in order to respond to varying amounts of external force applied to it. My switch can also be manufactured without a set screw 8 in stop 7, and in such a case the sensitivity of the switch could not be altered except by changing the physical dimensions of stop 7 or by bending said stop 7.

My "simple" type control uses switches as hereinbefore described. However, with the "booster" type control I prefer to use a modified type of snap-action switch as hereinafter described and as particularly shown in Figures 5 and 6, which are respectively side and front elevations thereof.

The only important difference between the modified switch and the hereinbefore described switch is in the construction of the stop and of the stop carrier. In accordance with this modified construction, there is fixedly secured to the stop carrier 1 spaced apart from the insulating base 2 an insulating plate 5a with a flanged extremity 5b. Secured to the flanged extremity 5b is a metallic stop 7a. The space between arc-resisting contact 9 and said stop 7a, may easily be adjusted by bending or twisting the lower end 7b of stop 7a and thus the operating characteristics of the switch may be varied.

Figure 12 is a circuit diagram of an electric oven controlled by my "simple" type control. It will be noted that the Bake switch A is in series with the bottom element, the Grill switch C is in series with the top element. A suitable signal mechanism may be inserted in series with the grill switch and it is preferably a signal mechanism which does not ring when current passes through it but rings only for an instant when after current has passed therethrough, the said current stops flowing.

Referring particularly to Figure 7 showing a simple type control with the manually adjustable lever at the "off" position, 31 is a casing with a circular aperture in its bottom flange 32 in which a tube 33 is journalled. A spindle 34 passes through the said tube. The upper end of the spindle is rotatably secured to the upper flange 35 of the switch casing. A bi-metallic thermostatic coil 36 is secured to the lower end of the spindle, and the other end of the coil is secured to the adjacent end of the tube 33. The tube extends upwardly within the casing and is also journalled through a bracket 37 secured at right angles to the back wall of the casing 31. The portion of bracket 37 which is adjacent to the back wall of casing 31 has uplifted edges, thus providing a channel-shaped portion. In this channel-shaped portion of bracket 37 is mounted a member 38 which is shaped to frictionally engage the surface of tube 33, whereby the latter will be frictionally held from free rotation. On the upper end of tube 33 is secured a cam 39 (see Figures 10 and 11) having lugs 40 and 41. A manually adjustable lever 42 is secured to the cam and thus the cam and the tube 33 to which said cam is mounted may be rotated. By turning tube 33, bi-metallic coil 36 and spindle 34 are, of course, also rotated. The lever 42 is provided with a pointer 43 at the extremity thereof, which is adjacent an arcuate dial 44 mounted on casing 31. To the upper end of spindle 34 is secured another cam 45 (see Figs. 10 and 11) with a projecting flange 46 which extends half way around the lower edge of said cam.

Suitably secured to the casing 31 at the left hand side of tube 33 is a snap-action switch A, which is otherwise identified as the Bake switch in the circuit diagram, Fig. 12. Switch A is of the normally-closed type, and it may be opened by the engagement of either lug 40 or lug 41 of cam 39 with the follower 6 of said switch A. Suitably secured to casing 31 at the right hand side of tube 33 is a snap-action switch B, also of the normally closed type, and which is otherwise identified as the Main switch. Switch B may be opened either by contact with the periphery of cam 39, or by flange 46 of cam 45. Adjacent the Main switch and to the right thereof is another switch C, otherwise identified as the Grill switch. Switch C is of the type which may normally remain either open or closed. A reciprocable push-button 47, made of insulating material is secured to casing 31 adjacent switch C, and it is held in a withdrawn position by means of coil spring 48. If push-button 47 is depressed, switch C will close and may be opened by the pressure of switch B against it when said switch B is displaced by either of cams 39 or 45.

When lever 42 is at the "off" position, the switches are in the position shown in Fig. 7, that is the circuits are all open. In other words lug 40 of cam 39 presses against switch A, keeping it open; the periphery of cam 39 presses against switch B, keeping it also open. Switch B is pressing against switch C, thereby also keeping said switch C open as described in the previous paragraph.

If it is desired to heat the oven for normal operation, lever 42 is moved from the "off" position to any position other than Grill. By so doing, lug 40 of cam 39 releases switch A, which snaps back and closes, thus closing one line to the bottom element. Simultaneously, the Main switch is closed since it no longer touches the periphery of cam 39, thus completing the electrical circuit to the bottom element. It should be noted here that to heat the bottom element, both the Bake switch and the Main switch must be closed.

When the Main switch is closed, it springs away from and out of physical contact with the Grill switch, and thus if push-button 47 is pressed, the Grill switch may also be closed, thus closing the circuit to the top element in order to pre-heat the oven. As the oven gradually warms up, cam 45 is slowly rotated clockwise as viewed from the top by thermostatic coil 36, and flange 46 of said cam 45 will eventually strike follower 6 of Main switch B, thereby causing the said Main switch to open, thus opening the circuits to both the upper and lower elements.

As the Main switch opens, it simultaneously pushes against the Grill switch C, and consequently the said Grill switch also will open. The oven will therefore slowly cool by a few degrees to the point where cam 45 will once again release the follower of the Main switch, thereby allowing said switch to close and consequently closing the circuit. However, upon release of the Main switch, the Grill switch will not be affected and will remain open since it can only be closed by pressing push-button 47. From then on, therefore, the Main switch permits the operation of the lower element only. The turning off and on of the Main switch through the action of the bi-metallic coil will cause the oven to remain approximately at the temperature predetermined by the setting of finger 42. If the finger is set further to the right, the position of the cams with respect to the switches is altered, and the oven must heat to a higher temperature in order to deflect the bi-metallic coil sufficiently to allow flange 46 of cam 45 to turn the switches off.

If the operator desires to use the upper element only, so as to grill the food, finger 42 must be set to the extreme right position, and then push-button 47 must be pressed. By setting finger 42 to the extreme right position, lug 41 of cam 39 will engage the Bake switch, thus turning it off, and simultaneously the Main switch will be released from the periphery of cam 39 and will therefore close.

Push-button 47 having been pressed, the Grill switch is thereby closed. The Grill switch and the Main switch being closed and the Bake switch being open, only the top element will heat. However, when the oven reaches a predetermined temperature, the thermostatic coil will rotate cam 45 to a point where its flange 46 will strike the Main switch thereby opening it, and the said Main switch being deflected will press against the Grill switch and open said Grill switch. Since the Grill switch can only be re-set manually the operator must again press push-button 47 if he wishes the oven to heat again. If the operator does press push-button 47 again, the oven will again heat up, but it will be impossible for it to heat to the danger point, since the thermostatic control will always turn it off when the danger point is approached.

Although my "simple" type thermostatic oven control has been described as having three switches, I also desire to claim as part of my invention a more elementary thermostatic oven control using the same general arrangement of thermostat, spindle and cams but having a Main switch only. With this control the circuit would have to be altered in order to have the Main switch in series with all the heating elements of an oven. It would thus be possible to turn the oven off and on, and also to adjust the control to have the oven reach a predetermined temperature, and remain at that predetermined temperature by the off and on action of cam 45 against the switch. Obviously with such a construction the advantages inherent to the "simple" type control would not all be achieved, but this construction could be satisfactory for less expensive types of stoves.

For the "booster" type control reference is made particularly to Figures 5 and 6 which are respectively side and front elevations of the snap-switches used in said control, and to Figures 13–25.

A narrow back plate or casing 50 is provided with a top flange 51 and a bottom flange 52. At each end of the back plate are side flanges 53 and 54; the side flanges are of approximately the same height as the snap-switches. Wings 53a and 54a are provided to secure the control to the oven on which it is mounted.

Secured to the back plate 50 are four snap-switches, namely a Grill switch D, a Main switch E, a Bake switch F, and a Boost switch G. It is convenient to mount the switches to the back plate by means of bolts 17 and 18 which form part of each switch assembly. The switches used with this control are preferably of the "modified" type hereinbefore described, and shown in greater detail in Figures 5 and 6. Main switch E, Bake switch F and Boost switch G are so constructed as to remain normally closed, whereas Grill switch D will normally remain in the position in which it has last been set, that is it will remain either open or closed.

Figures 23, 24:
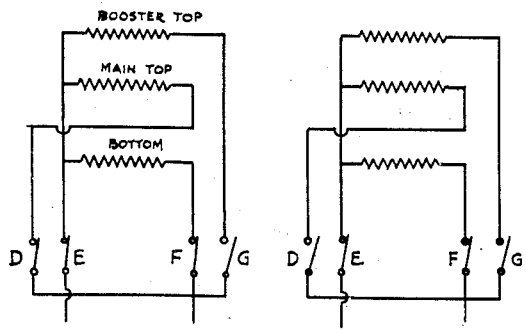
Figure 23 is a circuit diagram of an oven with a "booster" type control, showing the switches at the Preheat position.
Figure 24 is a circuit diagram of an oven with said control showing the switches at the Bake position.
Figure 25:
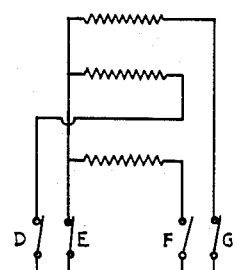
Figure 25 is a circuit diagram of an oven with said control showing the switches at the Grill position.

Figures 23, 24, and 25 are circuit diagrams of an oven using said "booster" type control, with the switches shown in various positions, as will be later explained. It will be noted that the Grill switch D is connected in series with the top main element, the Bake switch F is connected in series with the bottom element, the Boost switch G is connected in series with the booster top element, and the Main switch E is connected in series with all the elements. A suitable signal mechanism may be inserted in series with the Grill switch as in the "simple" type control and for a similar purpose.

Journalled in suitable apertures in top flange 51 and bottom flange 52 is a hollow tube 55 inside of which is forced a ring 56 at the top extremity thereof and a similar ring 57 near the bottom extremity thereof. Journalled in rings 56 and 57 is a spindle 58. A bi-metallic thermostatic coil 59 is secured to the lower extremity of spindle 58, and the other end of the coil is secured to the end of tube 55. Thus when changes in temperature cause distortion of bimetallic coil 59, spindle 58 will rotate to an extent proportionate to the said change in temperature.

Reciprocably mounted through suitable slots in side flanges 53 and 54 is a cam lever 60. Secured to cam lever 60 at the extremity thereof adjacent Grill switch D, is a catch 61 adapted to engage said Grill switch so as to pull it inwardly and thereby close it, as shown in Figures 18 and 19 (Grill positions).

Figure 18:
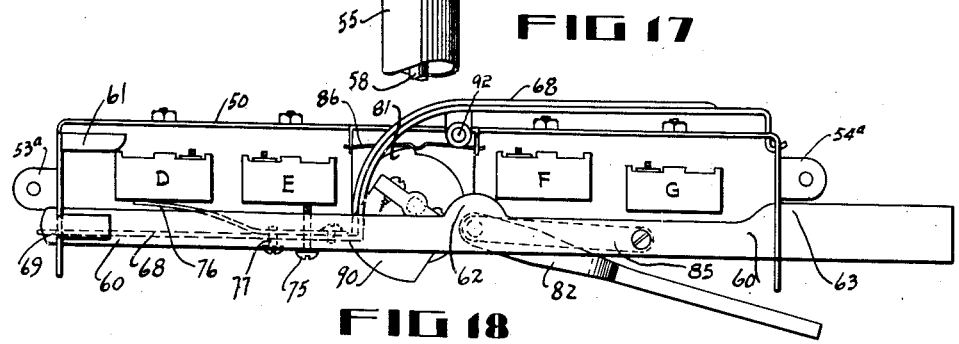
Figure 18 is a top plan view of said control, with the manually adjustable lever at the Grill position.
Figure 19:
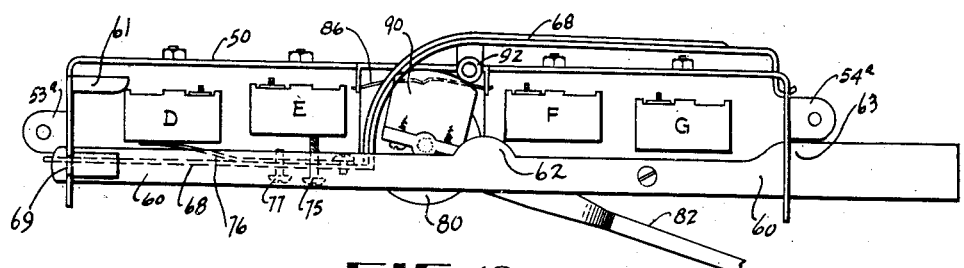
Figure 19 is a top plan view of said control, with the manually adjustable lever at the Grill position, showing the Main switch opened by the thermostatically actuated cam.
Figure 20:
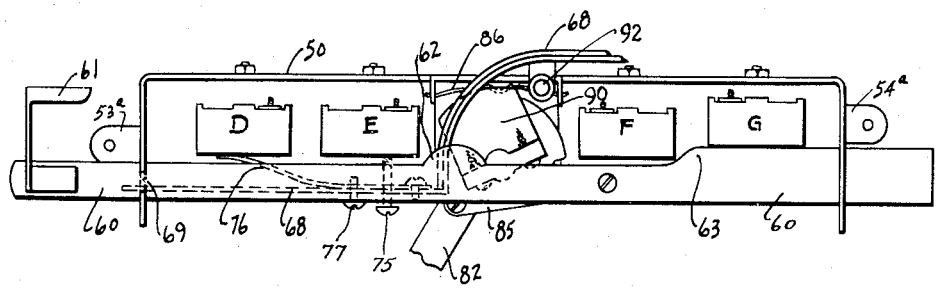
Figure 20 is a top plan view of said control, with the manually adjustable lever at the Bake position showing the switches set for Preheat.
Figure 22:
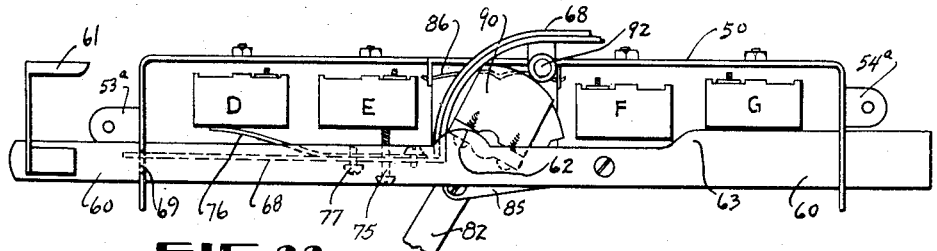
Figure 22 is a top plan view of said control, with the manually adjustable lever at Bake position, showing the switches as set by the thermostatically actuated cam when the oven becomes too hot.

Cam lever 60 is provided with an enlarged portion or cam 62 near the centre thereof, which is adapted to press against Bake switch F so as to open said Bake switch, as shown in Figures 18 and 19 (Grill positions). Similarly the opposite extremity of cam lever 60 is provided with another enlarged portion or cam 63 which is adapted to bear against either Boost switch G alone as shown in Figures 20 and 22 (Preheat and Bake positions), or against both the Boost and the Bake switches as shown in Figures 13, 14 and 17 ("off" positions). It will be observed that although cam 62 is adapted to engage the main switch in certain positions and cam 63 is adapted to engage the Boost switch and/or the Bake switch in other positions, the said cams are so constructed and so positioned as to provide clearance to the switches which they are adapted to engage in order to permit the said switches to close when the said cams are shifted to other positions.

Hingedly secured by one end to flange 54 is a cam follower arm 68, the other end of said cam follower arm being loosely mounted in a slot 69 provided in flange 53. Slot 69 is considerably wider than the thickness of cam follower arm 68, and therefore the said cam follower arm may move to and fro in said slot. Screwed in cam follower arm 68 at a point opposite Main switch E is an adjustment screw 75. When cam follower 68 is at rest, screw 75 does not touch the main switch. However, if the cam follower arm is pushed outwardly, the adjustment screw will bear against the Main switch thereby forcing it outwardly and causing said switch to open.

A leaf-spring 76 is secured at one end to the cam follower arm, the other end thereof being loose; the spacing between the loose end of the leaf spring and the cam follower arm may be adjusted by a screw 77 which is screwed in cam follower arm 68, and its tip bears against the surface of the leaf spring. If cam lever 60 is, say, in the position shown in Figure 20 (Preheat position), and cam follower arm 68 is pushed outwardly, both Grill switch D and Main switch E will be pushed outwardly by leaf-spring 76 and screw 75 respectively, and the switches will thereby open; the switches are then in the position shown in Fig. 22. On the other hand, if cam lever 60 is in the position shown in Figure 18 (Grill position), the Grill switch being thereby securely closed, and cam follower arm 68 is pushed outwardly, leaf spring 76 will bend thereby allowing screw 75 to press against Main switch E so as to open it, without affecting Grill switch D, as illustrated in Figure 19.

Embracing the top extremity of tube 55 is a cup-shaped member 80 to one side of which is a flange 81; to the opposite side of cup-shaped member 80 is secured manually adjustable lever 82. The bottom surface of cup-shaped member 80 is adjacent top flange 51, thus preventing downward displacement of tube 55, and a set screw 83 having a protruding head is screwed into tube 55 immediately below top flange 51 thus preventing upward displacement of tube 55. A link 85 joins lever 82 to cam lever 60. Thus when manually adjustable lever 82 is radially shifted, thereby rotating tube 55, the said motion of rotation is transmitted to cam lever 60 causing it to translate to an extent proportionate to the rotation of said tube 55.

A friction member 86 is secured to the upper surface of top flange 51, and said friction member engages flange 81 of cup-shaped member 80, thereby preventing accidental or undesired rotation of tube 55.

Secured to the top extremity of spindle 58 is a cam 90 which is formed from a stamping, as better illustrated in Figure 15; the radial position of cam 90 with respect to spindle 58 may easily be changed and adjusted by loosening screws 91; cam 90 and spindle 58 may be securely locked with respect to each other by tightening said screws 91.

A roller 92 is secured to and extends below cam follower arm 68 and the said roller is at times engaged by cam 90, thus causing the cam follower arm to move outwardly, thereby opening Grill switch D and/or Main switch E as previously described.

To set the control at the "off" position, manually adjustable lever 82 is rotated clock-wise to its far-left position as shown in Figures 13, 14 and 17. In this position cam 63 of cam lever 60 engages both the Bake and the Boost switch, thereby turning these switches off, and cam 90 secured to spindle 58 engages roller 92, thereby pushing cam follower arm 68 outwardly, which through screw 75 and leaf-spring 76 respectively forces the Grill and Main switches outwardly, thereby turning them off. Thus no current is supplied to any of the oven elements.

To set the oven so as to grill the food, manually adjustable lever 82 is rotated counter-clockwise to its far-right position, thereby turning on the Grill and the Boost element. Figure 25 is a circuit diagram of an oven with said control set at the Grill position, whereas Figure 18 is a top plan view of a control showing the manually adjustable lever at the Grill position. In this position, normally closed Boost switch G is released from cam 63 and thereby closes. Simultaneously cam 62 of cam lever 60 engages Bake switch F pushing it outwardly and turning it off; also simultaneously catch 61 pulls Grill switch D inwardly, thus turning it on. If the oven becomes too hot, bimetallic thermostatic coil 59 causes spindle 58 to rotate, and eventually cam 90 will engage roller 92, causing cam follower arm 68 to be pushed outwardly; screw 75 secured thereto will force Main switch E outwardly, thus turning the oven off. When the oven has sufficiently cooled, cam 90 will release roller 92, and cam follower arm 68 will return to its normal position, allowing normally closed Main switch E to close once again, which will permit current to flow to the Main top element and the Booster top element once again.

Figure 21:
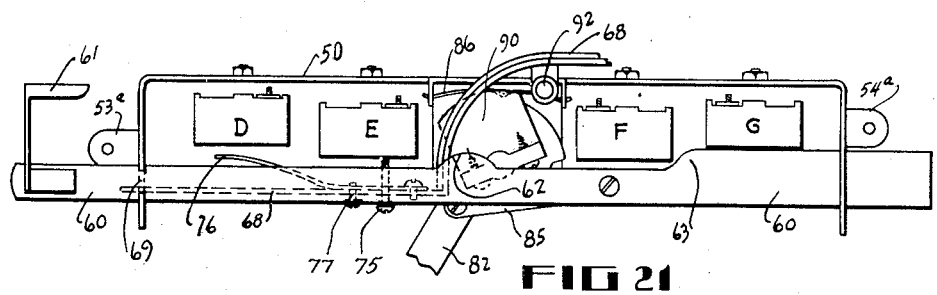
Figure 21 is a top plan view of said control, with the manually adjustable lever at Bake position, showing the switches set for normal baking.

It it is desired to set the control for normal baking, manually adjustable lever 82 is rotated from the "off" position to any position other than the Grill or far-right position. Figure 24 is a circuit diagram of an oven with this control showing the switches set at the Bake position, whereas Figure 21 is a top plan view of said control with the manually adjustable lever at the Bake position, showing the switches set for normal baking. In this position, normally closed Bake switch F is not engaged by either of cams 62 or 63, and therefore remains closed. Boost switch G is engaged by cam 63 and therefore is open, whereas Grill switch D which is engaged by spring 76 also remains open. Main switch E normally remains closed, but if the oven becomes too hot, bi-metallic thermostatic coil 59 will rotate spindle 58 causing cam 90 to engage roller 92 of cam follower arm 68, thereby pushing adjustment screw 75 secured thereto against Main switch E and causing said switch to open. This operation shown in Figure 22 which is a top plan view of the control with the manually adjustable lever set at the Bake position, showing the switches as set by the thermostatically actuated cam when the oven becomes too hot. With the Main switch open, there will be no current going to the oven. On the other hand, after the oven has sufficiently cooled, cam 90 will release cam follower arm 68, thereby allowing normally closed Main switch E to close once again, and thus current will again flow to the Bake element.

If the operator desires to use the oven for baking purposes, and at the same time desires the cold oven to heat rapidly, manually adjustable lever 82 is moved from the "off" position and rotated counter-clockwise to the far-right or Grill position, and immediately afterwards is moved back to the setting position for the desired temperature. This operation will set the switches as shown in Figure 23 which is a circuit diagram of an oven illustrating the switches at the preheat position. With this setting, the bottom and the Main top elements are both on, whereas the Booster top element is off, and as soon as the desired temperature is reached, the Main top element is turned off and will remain off whereas the bottom element will turn off and on as controlled by bi-metallic thermostatic coil 59.

As previously described regarding the setting of the control for grilling, when manually adjustable lever 82 is moved to the Grill position, the Grill, Main and Boost switches are turned on whereas the Bake switch is turned off. If immediately afterwards the handle is moved back to any other setting, cam 63 will engage the Boost switch thereby pushing it outwardly and turning it off, and cam 62 which was previously pushing the Bake switch outwardly, will release said Bake switch allowing it to return to its normally closed position. However, the Grill switch which is of the type which may remain either open or closed, or in other words will remain in the position in which it has last been set, will remain closed.

As the oven heats, thermostat coil 59 will rotate spindle 58 as previously described, and when it reaches the desired temperature it will cause cam follower arm 68 to move outwardly turning the Grill and Main switches off; there will thus be no current supplied to the oven. As soon as the oven has cooled sufficiently cam 90 will release the cam follower arm allowing the Main switch to return to its normally closed position, but the Grill switch will remain off. Thus once the oven has reached the predetermined temperature, further heat will be supplied only by the bottom element through the Main and Bake switches.

It should be pointed out that as in the case of the simple type control the setting of manually adjustable lever 82 will determine the temperature at which the oven will be maintained. The higher the oven temperature desired, the further to the right must manually adjustable lever 82 be set.

It is thought that the construction and use of the invention will be apparent from the above description of the various parts and their purpose. It is to be understood that the form of the invention herewith shown and described, is to be taken as a preferred example of the same and that various changes in the shape, size and arrangement of parts may be resorted to, without departing from the spirit of the invention, or the scope of the subjoined claims.

What I claim as my invention is:

1. In an electric range, the combination of an oven; a bake element and a grill element in the oven, the said elements being adapted to be connected to a power source; a casing; a plurality of switches secured to the casing, including a common switch for all the elements to control the supply of power thereto, and individual switches for each element separately controlling the supply of power to each element; a hollow rotatable shaft journalled at one end in the casing; a selecting cam member connected to the casing end of the shaft and movable therewith to selectively operate the switches; a rotatable spindle journalled in the hollow shaft; thermo-responsive means secured at one end to the other end of the shaft and at the other end to the spindle, the said thermo-responsive means extending into the oven and being responsive to the temperature of the oven to vary the rotary position of the spindle with respect to the hollow shaft; a cam secured to the casing end of the spindle, the said cam being movable by the spindle to open the common switch when the oven reaches a selected temperature and to thereafter close and open the common switch to maintain the oven at the selected temperature; and a single adjusting handle to simultaneously move the selecting cam member and rotate as a unit the hollow shaft, thermo-responsive means, spindle, and spindle cam, with respect to the casing to select the aforementioned oven temperature.

2. In an electric range, the combination of an oven; a bake element and a grill element in the oven, the said elements being adapted to be connected to a power source; a casing; a plurality of switches secured to the casing, including a common switch for all the elements to control the supply of power thereto, a bake switch to separately control the supply of power to the bake element, and a grill switch to separately control the supply of power to the grill element; a hollow rotatable shaft journalled at one end in the casing; manual means to close the grill switch, said grill switch being closable solely by manual means; a selecting cam member connected to the casing end of the shaft and movable therewith in one position to open all the switches and in another position to open the bake switch, close the common switch and condition the grill switch so that it may be closed by the said manual means; a rotatable spindle journalled in the hollow shaft; thermo-responsive means secured at one end to the other end of the shaft and at the other end to the spindle, said thermo-responsive means extending into the oven and being responsive to the temperature of the oven to vary the rotary position of the spindle with respect to the hollow shaft; a cam secured to the casing end of the spindle, the said cam being movable by the spindle to open the common switch and grill switch when the oven exceeds a selected temperature; and a single adjusting handle to simultaneously move the selecting cam member and rotate as a unit the hollow shaft, thermo-responsive means, spindle, and spindle cam, with respect to the casing to select the aforementioned oven temperature.

3. In an electric range, the combination of an oven; a bake element and a grill element in the oven, the said elements being adapted to be connected to a power source; a casing; a plurality of switches secured to the casing, including a common switch for all the elements to control the supply of power thereto, a bake switch to separately control the supply of power to the bake element and a grill switch to separately control the supply of power to the grill element; a hollow rotatable shaft journalled at one end in the casing; manual means to close the grill switch, the said grill switch being closable solely by manual means; a selecting cam member connected to the casing end of the shaft and movable therewith to selectively operate the bake and common switches and to condition the grill switch so that it may be closed by the manual means; a rotatable spindle journalled in the hollow shaft; thermo-responsive means secured at one end to the other end of the shaft and at the other end to the spindle, the said thermo-responsive means extending into the oven and being responsive to the temperature of the oven to vary the rotary position of the spindle with respect to the hollow shaft; a cam secured to the casing end of the spindle, the said cam being movable by the spindle to open the common switch when the oven reaches a selected temperature and to thereafter close and open the common switch to maintain the oven at the selected temperature, a mechanical contact between the common switch and the grill switch whereby the opening movement of the common switch simultaneously opens the grill switch if previously closed by the manual closing means, a subsequent closing movement of the common switch having no effect on the grill switch which is closable by manual means solely; and a single adjusting handle to simultaneously move the selecting cam member and rotate as a unit the hollow shaft, thermo-responsive means, spindle, and spindle cam, with respect to the casing to select the aforementioned oven temperature.

4. In an electric range, the combination of an oven; a bake element and a grill element in the oven, the said elements being adapted to be connected to a power source; a casing; a plurality of switches secured to the casing, including a common switch for all the elements to control the supply of power thereto, a bake switch to separately control the supply of power to the bake element, and a grill switch to separately control the supply of power to the grill element; a hollow rotatable shaft journalled at one end in the casing; manual means to close the grill switch, said grill switch being closable solely by manual means; a selecting cam member connected to the casing end of the shaft and movable therewith in one position to open all the switches, in a second position to close the bake and common switches and to condition the grill switch so that it may be closed by the said manual means, and in a third position to open the bake switch, close the common switch and condition the grill switch so that it may be closed by the said manual means; a rotatable spindle journalled in the hollow shaft; thermo-responsive means secured at one end to the other end of the shaft and at the other end to the spindle, said thermo-responsive means extending into the oven and being responsive to the temperature of the oven to vary the rotary position of the spindle with respect to the hollow shaft; a cam secured to the casing end of the spindle, the said cam being movable by the spindle when the oven reaches a selected temperature if the selecting cam member has been set at the second position to open the common switch and if in addition the grill switch has been closed by the manual means to also open the grill switch and to thereafter close and open the common switch to maintain the oven at the selected temperature by means of the bake element, the said cam being also movable by the spindle if the selecting cam member has been set at the third position and if in addition the grill switch has also been closed by the manual means, to open the common switch and the grill switch when the oven exceeds a selected temperature; and a single adjusting handle to simultaneously move the selecting cam member and rotate as a unit the hollow shaft, thermo-responsive means, spindle and spindle cam, with respect to the casing to select the aforementioned oven temperatures.

5. In an electric range, the combination of an oven; a bake element and a grill element in the oven, the said elements being adapted to be connected to a power source; a casing, a plurality of switches secured to the casing, including a common switch for all the elements to control the supply of power thereto, a bake switch to separately control the supply of power to the bake element, and a grill switch to separately control the supply of power to the grill element; a hollow rotatable shaft journalled at one end in the casing; a selecting cam member connected to the casing end of the shaft and movable therewith in one position to open all the switches and in another position to open the bake switch, and close the common and grill switches; a rotatable spindle journalled in the hollow shaft; thermo-responsive means secured at one end to the other end of the shaft and at the other end to the spindle, said thermo-responsive means extending into the oven and being responsive to the temperature of the oven to vary the rotary position of the spindle with respect to the hollow shaft; a cam secured to the casing end of the spindle, the said cam being movable by the spindle if the selecting cam member has been set at the said other position to open the common switch when the oven exceeds a selected temperature; and a single adjusting handle to simultaneously move the selecting cam member and rotate as a unit the hollow shaft, thermo-responsive means, spindle, and spindle cam, with respect to the casing to select the aforementioned oven temperature.

6. In an electric range, the combination of an oven; a bake element and a grill element in the oven, the said elements being adapted to be connected to a power source; a casing; a plurality of switches secured to the casing, including a common switch for all the elements to control the supply of power thereto, a bake switch to separately control the supply of power to the bake element, and a grill switch to separately control the supply of power to the grill element; a hollow rotatable shaft journalled at one end in the casing; a selecting cam member connected to the casing end of the shaft and movable therewith in one position to open all the switches and in another position to close the common and bake switches and to open the grill switch; a rotatable spindle journalled in the hollow shaft; thermo-responsive means secured at one end to the other end of the shaft and at the other end to the spindle, said thermo-responsive means extending into the oven and being responsive to the temperature of the oven to vary the rotary position of the spindle with respect to the hollow shaft; a cam secured to the casing end of the spindle, the said cam being movable by the spindle to open the common switch when the oven reaches a selected temperature and to thereafter close and open the common switch to maintain the oven at the selected temperature; and a single adjusting handle to simultaneously move the selecting cam member and rotate as a unit the hollow shaft, thermo-responsive means, spindle, and spindle cam, with respect to the casing to select the aforementioned oven temperature.

7. In an electric range the combination of an oven; a bake element and a grill element in the oven, the said elements being adapted to be connected to a power source; a casing; a plurality of switches secured to the casing, including a common switch for all the elements to control the supply of power thereto, a bake switch to separately control the supply of power to the bake element, and a grill switch to separately control the supply of power to the grill element; a hollow rotatable shaft journalled at one end in the casing; a selecting cam member connected to the casing end of the shaft and movable therewith in one position to open all the switches, in another position to open the grill switch and close the bake and common switches, and in a third position to open the bake switch and close the common and grill switches; a rotatable spindle journalled in the hollow shaft; thermo-responsive means secured at one end to the other end of the shaft and at the other end to the spindle, said thermo-responsive means extending into the oven and being responsive to the temperature of the oven to vary the rotary position of the spindle with respect to the hollow shaft; a cam secured to the casing end of the spindle, said cam being movable by the spindle when the oven reaches a selected temperature if the selecting cam member has been set in the said other position to open the common switch and to thereafter close and open the common switch to maintain the oven at the selected temperature by means of the bake element only, said cam being also movable by the spindle when the oven reaches a selected temperature if the selecting cam member has been set at the third position to open the common switch and to thereafter close and open the common switch to maintain the oven at the selected temperature by means of the grill element only; and a single adjusting handle to simultaneously move the selecting cam member and rotate as a unit the hollow shaft, thermo-responsive means, spindle, and spindle cam, with respect to the casing to select the aforementioned oven temperatures.

8. In an electric range, the combination of an oven; a bake element and a grill element in the oven, the said elements being adapted to be connected to a power source; a casing; a plurality of switches secured to the casing, including a common switch for all the elements to control the supply of power thereto, a bake switch to separately control the supply of power to the bake element, and a grill switch to separately control the supply of power to the grill element; a hollow rotatable shaft journalled at one end in the casing; a selecting cam member connected to the casing end of the shaft and movable therewith in one extreme position to open all the switches, and also movable therewith when after having been moved to the opposite extreme position it is moved to an intermediate position to close all the switches; a rotatable spindle journalled in the hollow shaft; thermo-responsive means secured at one end to the other end of the shaft and at the other end to the spindle, said thermo-responsive means extending into the oven and being responsive to the temperature of the oven to vary the rotary position of the spindle with respect to the hollow shaft; a cam secured to the casing of the spindle, the said cam being movable by the spindle when the oven reaches a selected temperature if the selecting cam member has been moved to an intermediate position after having been moved to the aforesaid opposite extreme position to open the common switch and the grill switch and to thereafter close and open the common switch to maintain the oven at the selected temperature by means of the bake element; and a single adjusting handle to simultaneously move the selecting cam member and rotate as a unit the hollow shaft, thermo-responsive means, spindle and spindle cam, with respect to the casing to select the aforementioned oven temperature.

9. In an electric range, the combination of an oven; a bake element, a grill element and a booster element in the oven, the said elements being adapted to be connected to a power source; a casing; a plurality of switches secured to the casing, including a common switch for all the elements to control the supply of power thereto and individual switches for each element to separately control the supply of power to each element, the individual switch to the grill element being closable manually only; manual control means including a single adjusting handle to selectively lock the bake switch or the booster switch in open position; thermo-responsive means for opening and closing the common switch in order to maintain the oven at a selected temperature by means of the grill element and the booster element if the bake switch has been locked in the open position and the grill switch closed, the said thermo-responsive means being also adapted, if the booster switch has been locked in the open position and the grill switch closed, to simultaneously open the grill switch and the common switch after the oven has reached a selected temperature and to thereafter open and close the common switch to maintain the oven at the selected temperature by means of the bake element, the single adjusting handle of the manual control means being also connected to the thermo-responsive means and being adapted to adjustably move the thermo-responsive means to select the aforementioned oven temperature.

10. In an electric range, the combination of an oven; a bake element, a grill element and a booster element in the oven, the said elements being adapted to be connected to a power source; a casing; a plurality of switches secured to the casing, including a common switch for all the elements to control the supply of power thereto and individual switches for each element to separately control the supply of power to each element, the individual switch to the grill element being closable manually only; manual control means including a single adjusting handle to selectively open and close the individual switches; thermo-responsive means for simultaneously opening the common switch and the grill switch after the oven has reached a selected temperature if the booster switch has been previously adjustd to open position by the manual control means and the grill switch closed, and for opening the common switch only after the oven has reached a selected temperature if the bake switch has been previously adjusted to open position by the manual control means, said thermo-responsive means being also adapted to close and open only the common switch after the common switch has been initially opened by the thermo-responsive means, in order to maintain the oven at the selected temperature, the single adjusting handle of the manual control means being also connected to the thermo-responsive means and being adapted to adjustably move the thermo-responsive means to select the aforementioned oven temperature.

11. In an electric range, the combination of an oven; a bake element, a grill element and a booster element in the oven, the said elements being adapted to be connected to a power source; a casing; a plurality of switches secured to the casing, including a common switch for all the elements to control the supply of power thereto and individual switches for each element to separately control the supply of power to each element, the individual switch to the grill element being closable manually only; manual control means including a single adjusting handle to lock the grill switch and the booster switch in closed position and to lock at the same time the bake switch in open position; thermo-responsive means for opening and closing the common switch in order to maintain the oven at a selected temperature by means of the grill element and the booster element; the single adjusting handle of the manual control means being also connected to the thermo-responsive means and being adapted to adjustably move the thermo-responsive means to select the aforementioned oven temperature.

12. In an electric range, the combination of an oven; a bake element, a grill element and a booster element in the oven, the said elements being adapted to be connected to a power source; a casing; a plurality of switches secured to the casing including a common switch for all the elements to control the supply of power thereto and individual switches for each element to separately control the supply of power to each element; manual control means including a single adjusting handle adapted to selectively open all the switches when in one extreme position and adapted when in the opposite extreme position to close the main switch, the grill switch and the booster switch and to open the bake switch; and thermo-responsive means for opening and closing the common switch when the handle is in the said opposite extreme position to maintain the oven at a predetermined temperature by means of the grill element and the booster element; the single adjusting handle of the manual control means being also connected to the thermo-responsive means and being adapted to adjustably move the thermo-responsive means to select the aforementioned oven temperature.

13. In an electric range, the combination of an oven; a bake element, a grill element and a booster element in the oven, the said elements being adapted to be connected to a power source, a casing; a plurality of switches secured to the casing including a common switch for all the elements to control the supply of power thereto and individual switches for each element to separately control the supply of power to each element; manual control means including a single adjusting handle adapted to open all the switches when in the "off" position and to open the booster switch and close the remaining switches when in another position; and thermo-responsive means operative when the handle is in said other position for simultaneously opening the common switch and the grill switch after the oven has reached a selected temperature and for closing and opening only the common switch after the common switch and the grill switch have initially been opened by the thermo-responsive means, in order to maintain the oven at the selected temperature by means of the bake element only; the single adjusting handle of the thermo-responsive means being also connected to the thermo-responsive means and being adapted to adjustably move the thermo-responsive means to select the aforementioned oven temperature.

14. In an electric range, the combination of an oven; a bake element, a grill element and a booster element in the oven, the said elements being adapted to be connected to a power source; a casing; a plurality of switches secured to the casing including a common switch for all the elements to control the supply of power thereto and individual switches for each element to separately control the supply of power to each element; manual control means for selectively operating the switches, said manual control means including a single adjusting handle adapted to open all the switches when in one extreme position and adapted when after having been moved to the opposite extreme position it is moved to an intermediate position to open the booster switch and close the remaining switches; and thermo-responsive means operative when a selected temperature has been reached, to open the grill and common switches and to thereafter actuate the common switch to maintain the oven at the selected temperature by means of the bake element only; the single adjusting handle of the manual control means being also connected to the thermo-responsive means and being adapted to adjustably move the thermally operated means to select the aforementioned oven temperature.

ELMORE STANLEY SMITH.

REFERENCES CITED

The following references are of record in the file of this patent:

UNITED STATES PATENTS

| Number | Name | Date |
| --- | --- | --- |
| 2,035,767 | Schulze | Mar. 31, 1936 |
| 2,385,433 | Weber | Sept. 25, 1945 |
| 2,388,702 | Pearce | Nov. 13, 1945 |
| 2,388,839 | Fry | Nov. 13, 1945 |
| 2,389,014 | Weber | Nov. 13, 1945 |
| 2,404,139 | McCormick | July 16, 1946 |